March 5, 1929.   J. F. WAIT   1,704,413
APPARATUS FOR HEATING CURVED SURFACES
Filed Jan. 17, 1925
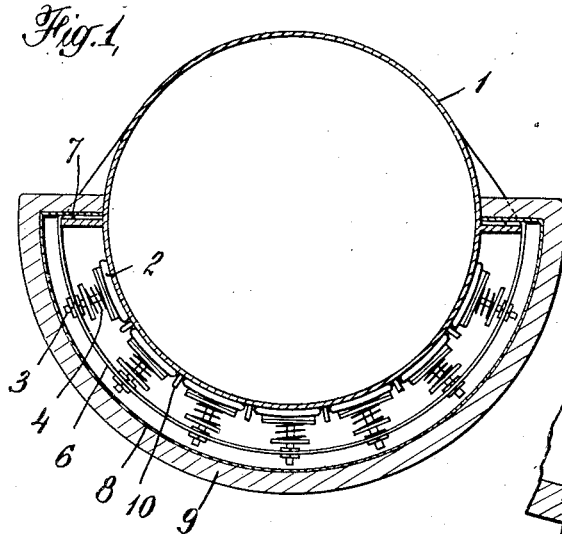
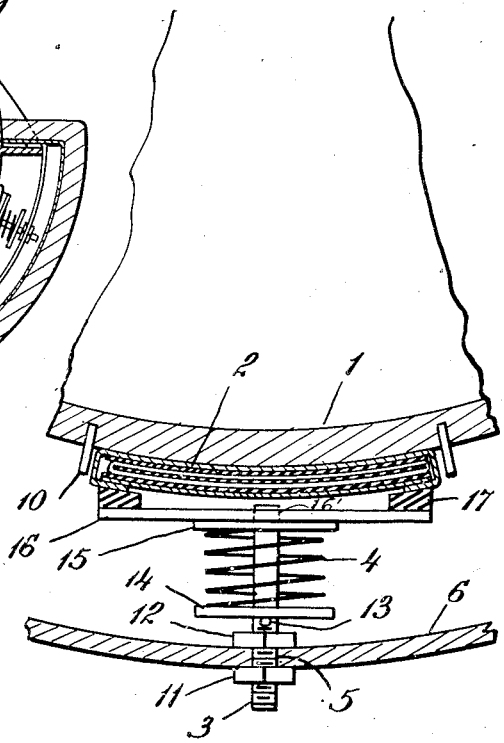
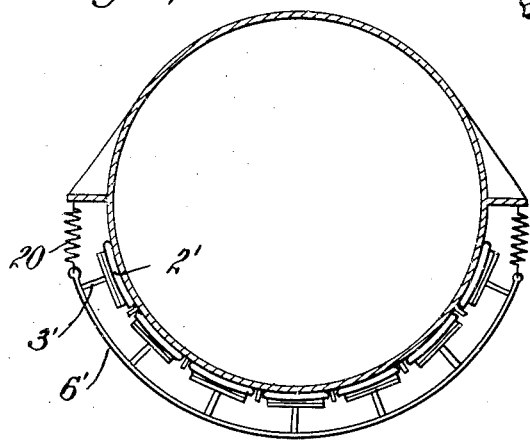
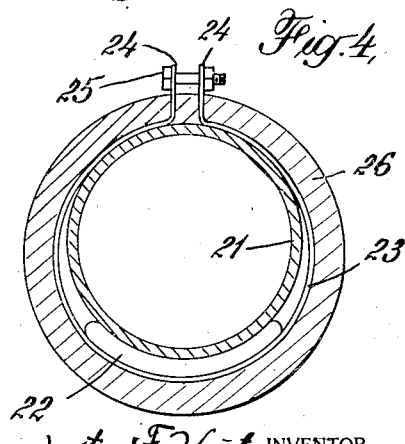
Justin F. Wait, INVENTOR
BY
Chas. H. Martin, ATTORNEY Patented Mar. 5, 1929.

1,704,413

UNITED STATES PATENT OFFICE.

JUSTIN F. WAIT, OF NEW YORK, N. Y., ASSIGNOR TO NATIONAL ANILINE & CHEMICAL CO., INC., A CORPORATION OF NEW YORK.

APPARATUS FOR HEATING CURVED SURFACES.

Application filed January 17, 1925. Serial No. 3,204.

This invention relates to the heating of surfaces by applying heating elements thereto. It relates more particularly to the heating of curved or irregular surfaces in such a manner that the heat from the heating element can be transmitted to the surface to be heated in a very regular and certain way.

In prior methods of applying heat to curved or irregular surfaces from heated elements such as electric heaters, for example, it has been customary simply to bring the heater into contact with the surface and permit the heat to pass from one to the other. In such devices it has been found that a flat surface of the heater itself will make contact with the curved surface of the object to be heated, only in a point or a line along which the most of the heat is transmitted. The air intervening between the remaining flat portion of the heater and the curved object to be heated serves as a heat insulator thus interferring seriously with the rapid transmission of the heat and causes certain spots to receive an excess of heat. Besides, the expansion and contraction caused by heating and cooling displaces the heaters and results in variation in pressure between the heater and the object to be heated.

By the present invention these difficulties are overcome and the curved or irregular surfaces to be heated are enabled to be heated in a very much more uniform, satisfactory and economical manner. In order to do this the heaters are made of such a shape that a considerable area of their surfaces will contact with the surface to be heated so that the heaters can be laid in contact with the surfaces in order for the heat to pass readily from one to the other. At the same time the heaters are firmly pressed against the surface to be heated preferably by spring means so that the pressure exerted thereon will be practically invariable regardless of changes due to expansion or contraction.

The invention will be understood from the description in connection with the accompanying drawings in which Fig. 1 is a section in elevation showing the invention in connection with a cylinder to be heated;

Fig. 2 is a sectional view partly broken away showing a detail of Fig. 1;

Fig. 3 is a view corresponding to Fig. 1 showing a modification; and

Fig. 4 shows the invention applied to a pipe.

In the drawings reference character 1 indicates a cylinder that is to be heated. The heaters 2 consist of electric heaters whose surfaces are bent into such shapes that a considerable portion of their areas will contact with the outer surface of the cylinder 1. To further insure efficient contact and transfer of heat a cement such as is disclosed in the patent to Clark et al., 1,269,052, granted June 11, 1918, may be used. These electric heaters 2 may be of the standard make or type, each one consisting of a special resistance wire within the mica or other insulation and protected by steel or other metal. The heaters 2 are provided with pins 3 on the back thereof which are surrounded by pressure springs 4. These pins 3 extend through holes 5 of a band or strap 6 whose ends are anchored in any convenient manner as shown at 7 to the sides of the cylinder 1. The cylinder may be surrounded by a removable jacket or casing 8 that may be lagged with heat insulating material 9. This casing 8 is preferably so connected to the sides of the vessel 1 and otherwise so protected as to avoid danger of water or chemicals finding their way inside the casing to the heaters 2 or to their connections. Pins 10 may extend into the cylinder 1 and between the several heaters 2 for determining the correct location of the heaters 2 and retaining the same in place. Other convenient means may be utilized for keeping the heaters 2 in place.

As more clearly indicated in Fig. 2, the pin 3 may be made adjustable on the strap 6 by means of the lock nuts 11 and 12. The pin 3 is also provided with a cross pin 13 upon which the washer 14 rests. One end of the spring 4 rests against the washer 14 and the other end of the spring 4 rests against the washer 15. The washer 15 rests against a yoke 16 which has a hole 16' through which the pin 3 passes. Parts of the yoke 16 may be made of heat insulating material as indicated at 17 to avoid transmission of heat from the heater 2 to the spring 4 and associated parts of the holding means. The yoke 16 is preferably so shaped that the pressure transmitted by it from the spring 3 to the heater 2 will not be applied at the middle portion of the heater 2. It is, of course, understood that the connections between the yoke 16, pin 3 and band 6 may be reversed so that the pin 3 will be adjustably secured to the yoke 16 and slide in a hole in band 6.

In the modification shown in Fig. 3 the strap 6' is used in lieu of the springs 3. In this modification the strap 6' is anchored at its respective ends to the sides of the cylinder with springs 20 interposed for the purpose of sustaining a substantial pressure. In this case the connection between the strap 6' and a pin 3' of the heater will be somewhat rigid and if desirable springs may be introduced in this modification similar to the springs 4 described in connection with Figs 1 and 2. Evidently for the straps 6' may be substituted flexible means such as chains, cables, or the like for associating the heaters and transmitting the pull of the springs or other resilient means to them; and such means may be integral in external contact with the heaters or pins or the like extending from them, or they may be in sections connected to contiguous heaters. In the modification shown in Fig. 4 the pipe 21 is heated by means of the electric heater 22 which is shaped somewhat in conformity with the shape of the pipe 21 as indicated in the drawing. The heater 22 is preferably attached to the bottom of the pipe 21. The heater 22 is pressed in firm contact with the pipe 21 by means of the metal strap 23 which is provided with ears 24 through which a screw 25 extends for adjusting same. The springiness of this strap especially near the ear portions thereof is sufficient to maintain a substantial pressure upon the heater 22 regardless of conditions due to expansion and contraction of the pipe 21. The strap 24 and pipe 21 are surrounded by heat insulating material 26.

In using this method of heating curved or irregular surfaces, it has been found desirable to distribute the heaters along the surfaces at such convenient intervals apart as to enable the heat to be transmitted directly from the heaters into the surfaces to be heated and then to be conducted laterally so that all portions are heated to approximately the same extent.

I claim:

1. Heating apparatus comprising in combination a plurality of heaters, a strap for insuring contact of said plurality of heaters with a body to be heated, and resilient means associated with said strap and heaters and substantially without the heated zone for maintaining said contact.

2. Heating apparatus comprising in combination a plurality of heaters, a strap for insuring contact of said plurality of heaters with a body to be heated, spacing means to hold the heaters away from bodily contact with the straps the ends of said strap extending without the heated zone, and resilient means connected with the strap ends for maintaining said contact.

3. Heating apparatus comprising in combination a plurality of heaters, and means associated with said plurality of heaters for insuring contact of said heaters with a body to be heated, and means to hold said heaters in contact with said body regardless of distortions of said body.

4. A heating apparatus comprising in combination a plurality of heaters, means adapted to hold said heaters in contact with the body to be heated, and yielding means connecting said heaters with said means.

5. A heating apparatus comprising in combination a plurality of heaters, means adapted to hold said heaters in contact with the body to be heated, and a heat insulating connection between said heaters and said means.

6. A heating apparatus comprising in combination a heater, flexible means adapted to hold said heater in contact with a body to be heated, and yielding means connecting said heater with said flexible means.

7. A heating apparatus comprising in combination a heater, flexible means adapted to hold said heater in contact with a body to be heated, and yielding and adjustable means connecting said heater with said flexible means.

8. A heating apparatus comprising in combination a plurality of electrical heaters, flexible means adapted to hold said heaters in contact with a body to be heated, and resilient means connecting said heaters with said flexible means.

9. A heating apparatus comprising in combination a heater, flexible means adapted to hold said heater in contact with a body to be heated, and a heat insulating connection between said heater and said flexible means.

10. A heating apparatus comprising in combination a plurality of heaters, a strap yieldingly held and adapted to hold said heaters in contact with a body to be heated, and a heat insulating connection between said heaters and said strap.

11. A heating apparatus comprising in combination a plurality of electrical heaters, a spring held strap adapted to hold said heaters in contact with the body to be heated, and a heat insulating connection between said heaters and said strap.

12. A heating apparatus comprising in combination a plurality of electrical heaters, flexible means adapted to hold said heaters in contact with a body to be heated, and heat insulated means resiliently connecting said heaters and said flexible means.

13. A heating apparatus comprising in combination a plurality of electrical heaters, a pin extending from the back of each heater, and means coacting with said pins to hold said heaters in contact with a body to be heated.

14. A heating apparatus comprising in combination a plurality of electrical heaters, a pin having a heat insulating connection with the back of a heater, and a strap adjustably secured to said pin for holding said heater in contact with a body to be heated.

15. A heating apparatus comprising in combination a plurality of electrical heaters, a yoke attached to the back of each heater, a pin connected to said yoke, and a strap yieldingly held and adapted to cooperate with said pins to hold said heaters in contact with a body to be heated.

16. A heating apparatus comprising in combination an electrical heater, a yoke, a heat insulating connection between said heater and said yoke, a pin carried by said yoke, and a yieldingly held strap cooperating with said pin to hold said heater in contact with a body to be heated.

17. A heating apparatus comprising in combination a plurality of electrical heaters, a spring held strap, a pin slidably connected at one end with one of said heaters and adjustably connected at the other end with said strap, and resilient means holding said strap and heater in spaced relation.

18. A heating apparatus comprising in combination a plurality of electrical heaters shaped to conform to the surface of a body to be heated, a yoke cooperating with each of said heaters and having a heat insulating connection therewith, said yoke having a hole therein, a flexible member, a pin for each yoke having one end thereof slidably mounted in said hole and the other end thereof adjustably secured to said flexible member, and yielding means encircling said pin and adapted to hold said flexible member and yoke in yielding spaced relation.

19. A heating apparatus comprising in combination a plurality of electrical heaters shaped to conform to the surface of a body to be heated, a yoke attached to each of said heaters in heat insulating relation, said yoke having a hole therein, a strap adapted to hold said heaters in contact with said body, a pin for each yoke having one end thereof slidably mounted in said hole and the other end thereof adjustably secured to said strap, and a coil spring enclosing said pin adapted to hold said strap and yoke in yielding spaced relation.

20. In a device of the character described the combination comprising a plurality of heaters, means for maintaining said heaters in contact with the body to be heated, and means to hold the heaters away from bodily contact with said first named means.

In testimony whereof I affix my signature.

JUSTIN F. WAIT.